(12) United States Patent
Yang

(10) Patent No.: US 7,196,433 B2
(45) Date of Patent: Mar. 27, 2007

(54) MULTI-OUTPUT DEVICE WITH PRESET POWER SUPPLY PRIORITY

(76) Inventor: Tai-Her Yang, No. 59, Chung Hsiao 8 St., Si-Hu Town, Dzan-Hwa (TW)

( * ) Notice: Subject to any disclaimer, the term of this patent is extended or adjusted under 35 U.S.C. 154(b) by 481 days.

(21) Appl. No.: 10/214,490

(22) Filed: Aug. 8, 2002

(65) Prior Publication Data
US 2004/0027003 A1 Feb. 12, 2004

(51) Int. Cl.
*H02J 1/06* (2006.01)
*H02J 3/14* (2006.01)

(52) U.S. Cl. .......................... 307/35; 307/39; 307/131; 700/295

(58) Field of Classification Search ................ 307/131, 307/39, 35; 700/295
See application file for complete search history.

(56) References Cited

U.S. PATENT DOCUMENTS 3,359,551 A * 12/1967 Dennison ................ 700/295
3,842,249 A * 10/1974 Geyer et al. ............. 700/295
3,944,885 A * 3/1976 Sparling .................. 361/54
4,075,699 A * 2/1978 Schneider et al. ........ 700/291
4,310,770 A * 1/1982 Keener et al. ............ 307/35
4,324,987 A * 4/1982 Sullivan et al. ........... 700/295
4,349,879 A * 9/1982 Peddie et al. ............. 700/295
5,181,180 A * 1/1993 Munro .................... 307/39
5,481,140 A * 1/1996 Maruyama et al. ....... 307/11

* cited by examiner

*Primary Examiner*—Brian Sircus
*Assistant Examiner*—Andrew Deschere
(74) *Attorney, Agent, or Firm*—Rabin & Berdo, P.C.

(57) ABSTRACT

A multi-output circuit device with preset power supply priority that provides higher safety, wherein, the load of inferior priority depending on the preset overload breaking sequence is cut off first when the total load amperage exceeds the rated amperage while maintaining power supply to the load of superior priority under the operation status of variable local loads.

11 Claims, 9 Drawing Sheets

MULTI-OUTPUT DEVICE WITH PRESET POWER SUPPLY PRIORITY

BACKGROUND OF THE INVENTION (a) Field of the Invention

The present invention is related to a multi-output device, and more particularly, to one that allows setting up the priority of a power supply sequence so that when the total load amperage becomes greater than the rated amperage, the load with inferior priority will be cut off.

(b) Description of the Prior Art

A multi-output distribution system, industrial facility, domestic power distribution, or the ordinarily multi-outlet socket of the prior art usually supplies power to a variable load. However, when the load varies or an additional load is turned on, the total load amperage may become greater than the rated amperage. Accordingly, a breaker at the source trips to cut off the power supplied to all outputs resulting in inconvenience and loss because all the outputs are cut off at the same time.

SUMMARY OF THE INVENTION

The primary purpose of the present invention is to provide a multi-output circuit device with higher safety that permits the setting up of a power supply priority sequence by cutting off the load with inferior priority depending on the variable status of the local loads when the total load amperage exceeds the rated amperage so to maintain power to the load with superior priority.

DETAILED DESCRIPTION OF THE PREFERRED EMBODIMENTS

A multi-output circuit device with preset power supply priority of the present invention is able to set up the priority to supply power for each output interface by having a certain circuit layout to control a distribution system provided with two or more than two output interfaces or a distribution circuit system or socket unit of independent electric equipment. As a result, when a local multi-output load varies to cause the total load amperage to exceed the rated amperage, the load of the output of inferior priority (as preset) is cut off to reduce the total load amperage down to a level within the rated amperage. Furthermore, the multi-output circuit device with present power supply priority of the present invention relates to a multi-output power supply circuit device for a variable local load that provides higher safety. If a variable local load and the total load amperage exceed the rated amperage, the load of inferior priority depending on the preset overload breaking sequence is cut off while power to the load of superior priority is maintained.

Figure 1:
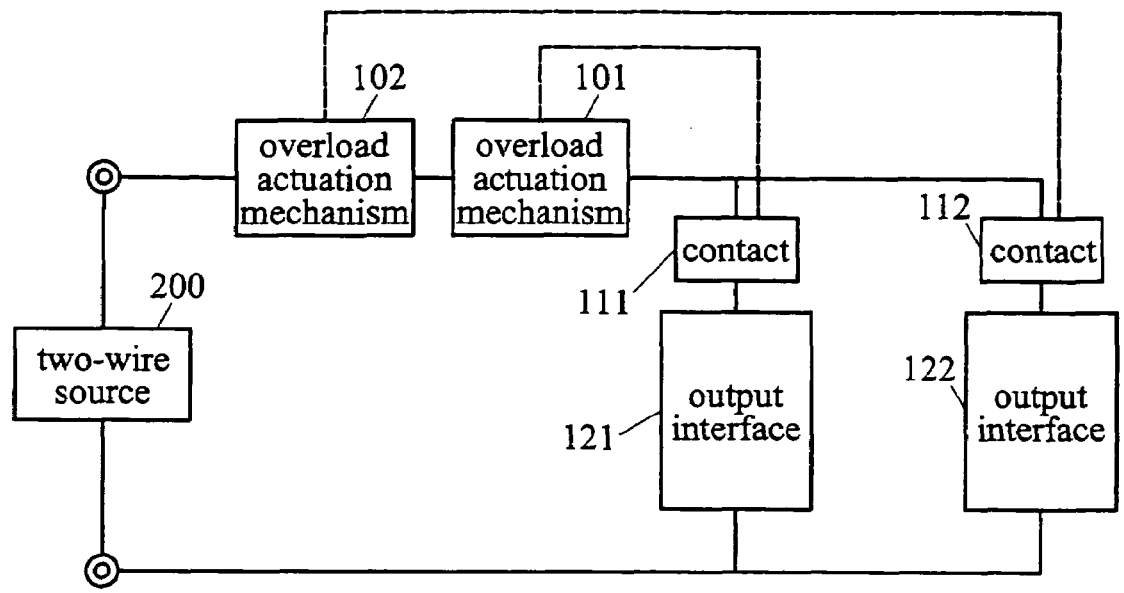
FIG. 1 is a schematic view of a basic circuit of a multi-output circuit device of the present invention that permits setting up of the priority of a power supply sequence.

FIG. 1 is a schematic view of a basic circuit of a multi-output circuit device of the present invention that permits the setting up of the priority of a power supply sequence. The basic circuit is essentially comprised of:

A multi-output circuit device that permits setting up the priority of a power supply sequence is used with a DC or a single-phase AC two-wire source 200 to control a multi-output interface device. Two units of overload breakers with different overload brake ratings are provided, with each being comprised of a mechanism actuated by the overload current, or by an effect of the overload current. The mechanisms are actuated by the heat generated from the overload current or by an effect of the overload current, and function as overload breakers to cut off the power when the circuit is overloaded. The overload actuation mechanisms 101, 102 are connected in series. The rated overload trip amperage of the overload actuation mechanism 101 is slightly greater than that of the overload actuation mechanism 102. The circuit may also include a trip status retaining mechanism, e.g., a mechanism that retains the trip status by magnetic force of a EM coil, or by the magnetic force of a permanent magnetic stick, or by a prestressed tenon, and that is manually reset or reset by mechanical or EM force. Both of the overload actuation mechanisms 101 and 102 are comprised of devices that are either actuated by heat generated from overload current or by current excitement of overload breakers of different rated overload amperages. They are connected to each other and to the power cable in series. Individual contacts 111, 112 from the overload actuation mechanisms 101, 102 with different ratings of overload amperage are respectively connected in series with each output for the circuit to individually control each output. The contact 111 of the overload actuation mechanism 101 with a greater overload amperage is connected in series with a first output interface 121 with the top priority so to control the first output interface 121, and the contact 112 of the overload actuation mechanism 102 with the second greatest overload amperage is connected in series with the second output interface 122 at the output of power supply with the second priority to control the second output interface 122. If the total output amperage from each output is greater than the rated value, the contact 112 controlled by the overload actuation mechanism 102 with the second greatest overload amperage trips off first to reduce the sum of the amperage. If the sum of the amperage remains excessively high, the contact 111 controlled by the overload actuation mechanism 101 with the greatest overload amperage also trips off to cut off all output current.

Figure 2:
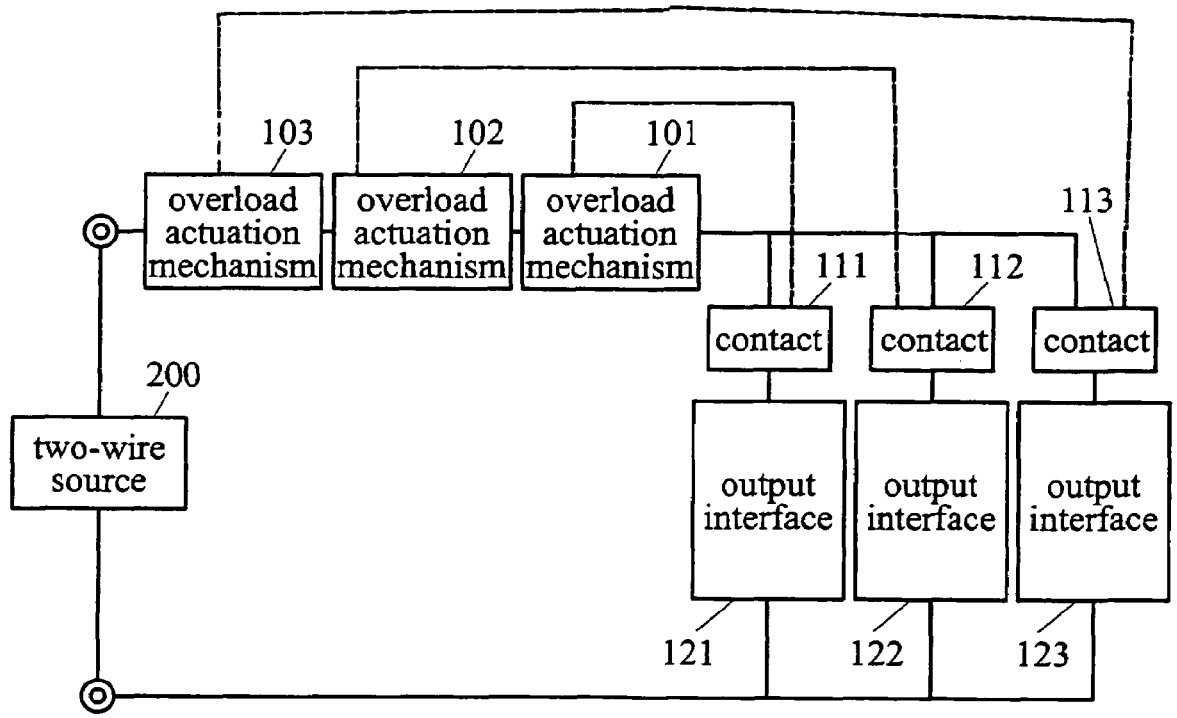
FIG. 2 is another schematic view of a basic circuit of a multi-output circuit device of the present invention that permits setting up of the priority of a power supply sequence.

FIG. 2 shows another schematic view of a basic circuit of a multi-output circuit device of the present invention that permits setting up the priority of power supply sequence. The circuit is essentially comprised of:

A multi-output circuit device that permits setting up the priority of a power supply sequence, used with a DC or AC two-wire source 200 and a multi-output load, is comprised of two or more than two units of overload breakers with different rated overload breaking circuits. The overload breakers include overload actuation mechanisms 101, 102 and 103. Each of them is comprised of a structure that is thermally actuated by the overload current, or of a breaking mechanism actuated by excitement effects of the overload current. The rated overload amperage of the overload actuation mechanism 101 is slightly greater than that of the overload actuation mechanism 102, and the rated overload amperage of the overload actuation mechanism 102 is slightly greater than that of the overload actuation mechanism 103. Each mechanism (actuated by the heat generated from the overload current or by excitement effect of the overload current) functions as an overload breaker to cut off the contact under its control when the circuit is overloaded. The circuit may also have a trip status retaining mechanism, e.g., a mechanism retaining the trip status by magnetic force of an EM coil, or by the magnetic force of a permanent magnetic stick, or by a prestressed tenon, and that is manually reset or reset as driven by mechanical or EM force. The overload actuation mechanisms 101, 102, 103 (comprised of devices either actuated by heat generated from overload current or by current excitement of overload breakers of different rated overload amperages) are connected to each other and to the power cable in series; and the individual contacts 111, 112, 113 from the overload actuation mechanisms 101, 102, 103 with different ratings of overload amperage are respectively connected in series with each output for the circuit to individually control each output. The contact 111 of the overload actuation mechanism 101 with a greater overload amperage is connected in series with a first output interface 121 at the output of the power supply with the top priority so to control the first output interface 121. The contact 112 of the overload actuation mechanism 102 with the second greatest overload amperage is connected in series with the second output interface 122 at the output of the power supply with the second priority to control the second output interface 122. The contact 113 of the overload actuation mechanism 103 with the least greatest overload amperage is connected in series with the third output interface 123 at the output of the power supply with the second priority to control the third output interface 123 in a multi-output status depending on the local changes. If the total output amperage from each output is greater than the rated value, the contact 113 controlled by the overload actuation mechanism 103 with the least overload amperage trips off first to reduce the sum of the amperage. If the sum of the amperage remains excessively high, the contact 112 controlled by the overload actuation mechanism 102 with the second greatest overload amperage also trips off to cut off all output current; and if the sum of the amperage still remains excessively high, the contact 111 controlled by the overload actuation mechanism 101 with the greatest overload amperage also trips off to cut off all output current.

Figure 3:
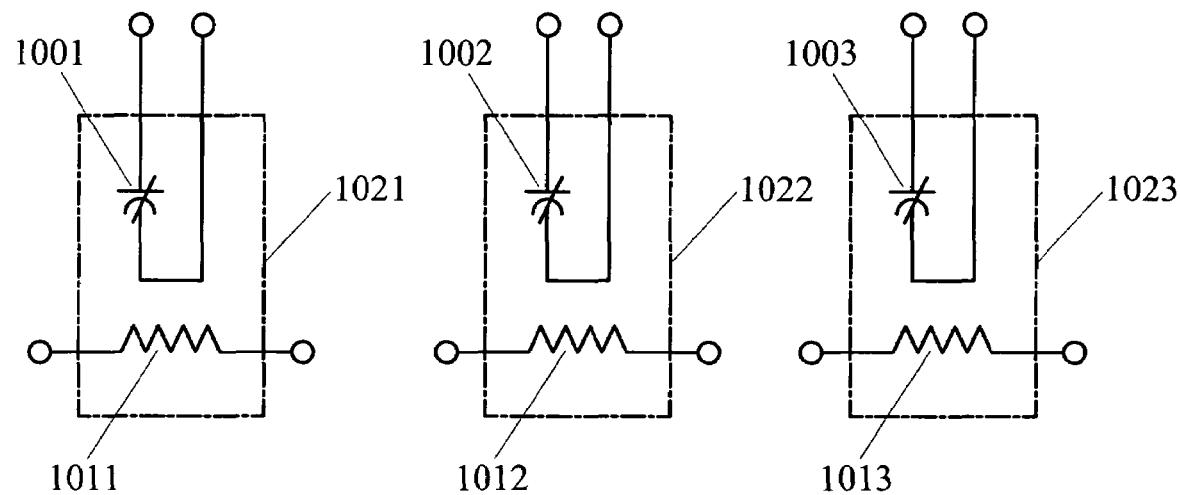
FIG. 3 is a schematic view of the present invention separately adapted with a mechanism that is actuated by heat generated from overload current.

Those overload breakers with different rated amperage may be provided in the following configurations as required by the operation:

1) Two or more than two overload breakers 1021, 1022, 1023 have different overload amperages and are each provided with thermally actuated contacts 1001, 1002, 1003 respectively adapted with thermally actuated mechanisms 1011, 1012, 1013. They each include a contact structure made of thermally actuated bi-metal or memory alloy that is cut off due to overheating during an overload. The circuit may also have a trip status retaining mechanism, e.g., a mechanism retaining the trip status by magnetic force of an EM coil, or by magnetic force of a permanent magnetic stick, or by a prestressed tenon, and that is manually reset or reset as driven by mechanical or EM force. Each of those thermally actuated mechanisms 1011, 1012, 1013 generates heat depending on the overload current and they are connected in series with thermally actuated contacts 1001, 1002, 1003. Furthermore, material of low melting point may be selected for the thermally actuated mechanism by the overload amperage for the actuation mechanism to provide the function of a fuse for overload breaking as is illustrated in FIG. 3, a schematic view of the present invention separately adapted with a mechanism that is actuated by heat generated from overload current, and its contacts.

Figure 4:
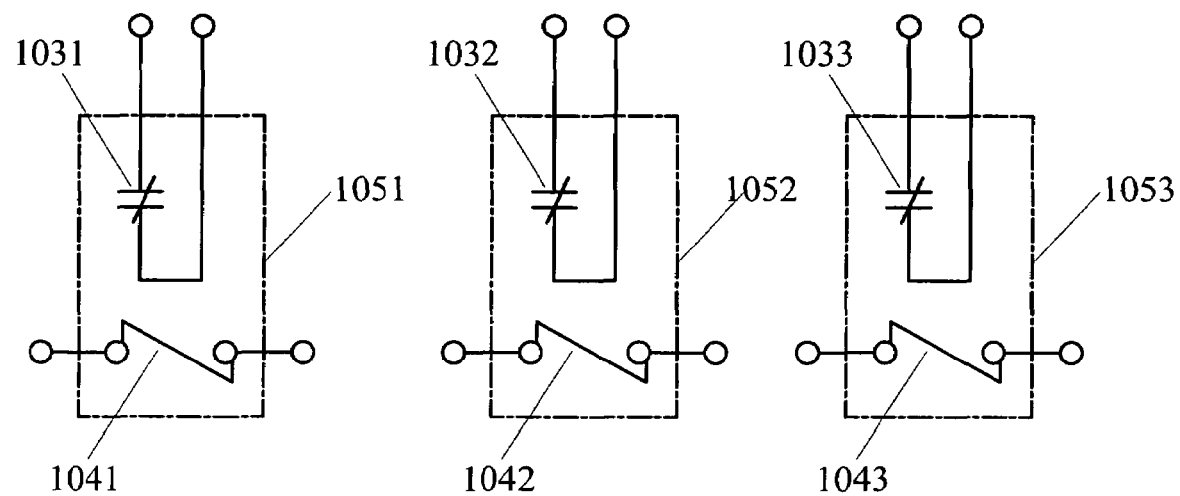
FIG. 4 is a schematic view of the present invention separately adapted with a mechanism that is actuated by an electromagnetic effect.

2) Two or more than two overload breakers 1051, 1052, 1053 have different overload amperages and are each provided with thermally actuated contacts 1031, 1032, 1033 respectively adapted with those EM effect actuated mechanisms 1041, 1042, and 1043. They each include a current relay to attract a contract to trip off for breaking the circuit when the current is overloaded, or a prestress controlled contract mechanism adapted to a triggering mechanism driven by current through a coil. The circuit may also include a trip status retaining mechanism, e.g., a mechanism retaining the trip status by magnetic force of an EM coil, or by magnetic force of a permanent magnetic stick, or by a prestressed tenon, and that is manually reset or reset as driven by mechanical or EM force. Individual EM effect actuated mechanisms 1041, 1042, 1043 are connected in series so as to respectively cut off their matching contacts 1031, 1032, 1033 at various overload amperages. FIG. 4 shows a schematic view of the present invention separately adapted with a mechanism that is actuated by an electromagnetic effect, and its contacts.

Figure 5:
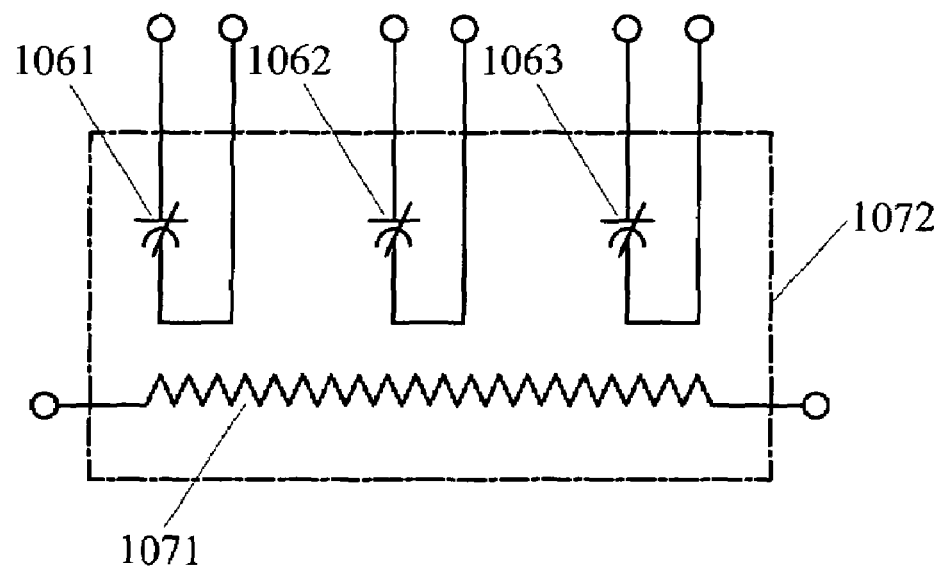
FIG. 5 is a schematic view of the present invention adapted with a common multi-contact overload breaker comprised of independent contacts and a matching common mechanism actuated by heat.

3) FIG. 5 shows a common multi-contact overload breaker 1072 comprised of two or more than two individual thermally actuated contacts 1061, 1062, 1063 jointly adapted with a common thermally actuated mechanism 1071 so that under different overload amperages, those thermally actuated contacts 1061, 1062, 1063 depending on the various circuit breaking operation are cut off at the priorities set from the least up to the greatest overload amperage. They include a contact structure made of thermally actuated bi-metal or memory alloy that is cut off due to overheating because of an overload. The circuit may also include a trip status retaining mechanism, e.g., a mechanism retaining the trip status by magnetic force of an EM coil, or by magnetic force of a permanent magnetic stick, or by a prestressed tenon, and that is manually reset or reset as driven by mechanical or EM force. Furthermore, material of low melting point may be selected for the thermally actuated mechanism to provide the function of a fuse as illustrated in FIG. 5.

Figure 6:
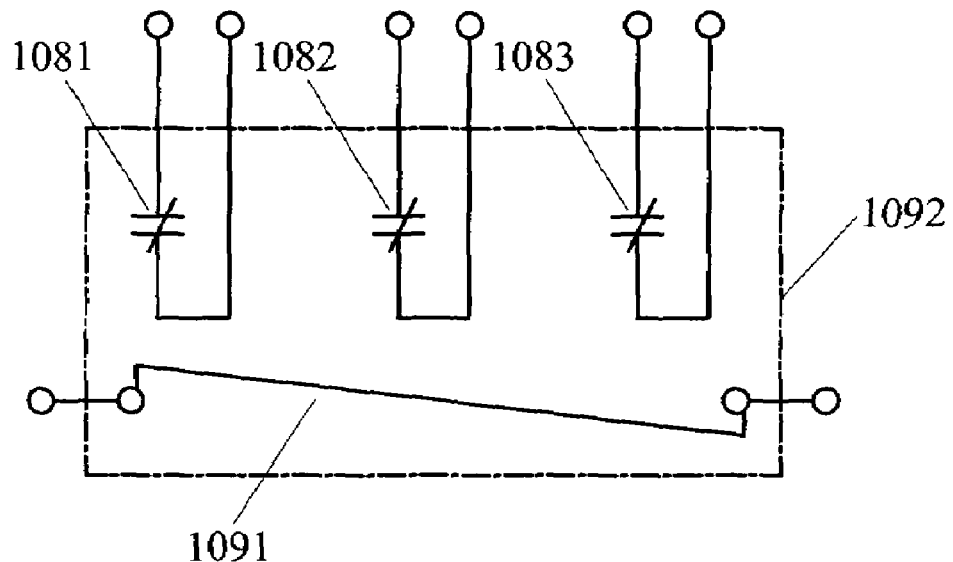
FIG. 6 is a schematic view of the present invention adapted with a common multi-contact overload breaker comprised of independent contacts and a matching common mechanism actuated by an electromagnetic effect.

4) A common multi-contact overload breaker 1092 is comprised of two or more than two individual EM effect actuated contacts 1081, 1082, 1083 jointly adapted with a common EM effect actuated mechanism 1091. The EM effect actuated contacts 1081, 1082, 1083 may depend on various circuit breaking operations to cut off at the priorities set from the least up to the greatest overload amperage. A current relay may be provided to attract a contract to trip off for breaking the circuit when the current is overloaded, or a prestress controlled contract mechanism may be adapted to the triggering mechanism driven by current to a coil so to be pressed to release the prestressed contact into the status of trip off to break the circuit when the current is overloaded. The circuit may further include a trip status retaining mechanism, e.g., a mechanism retaining the trip status by magnetic force of an EM coil, or by magnetic force of a permanent magnetic stick, or by a prestressed tenon, and that is manually reset or reset as driven by mechanical or EM force. FIG. 6 shows a schematic view of the present invention adapted with a common multi-contact overload breaker comprised of independent contacts and a matching common mechanism actuated by an electromagnetic effect.

Figure 7:
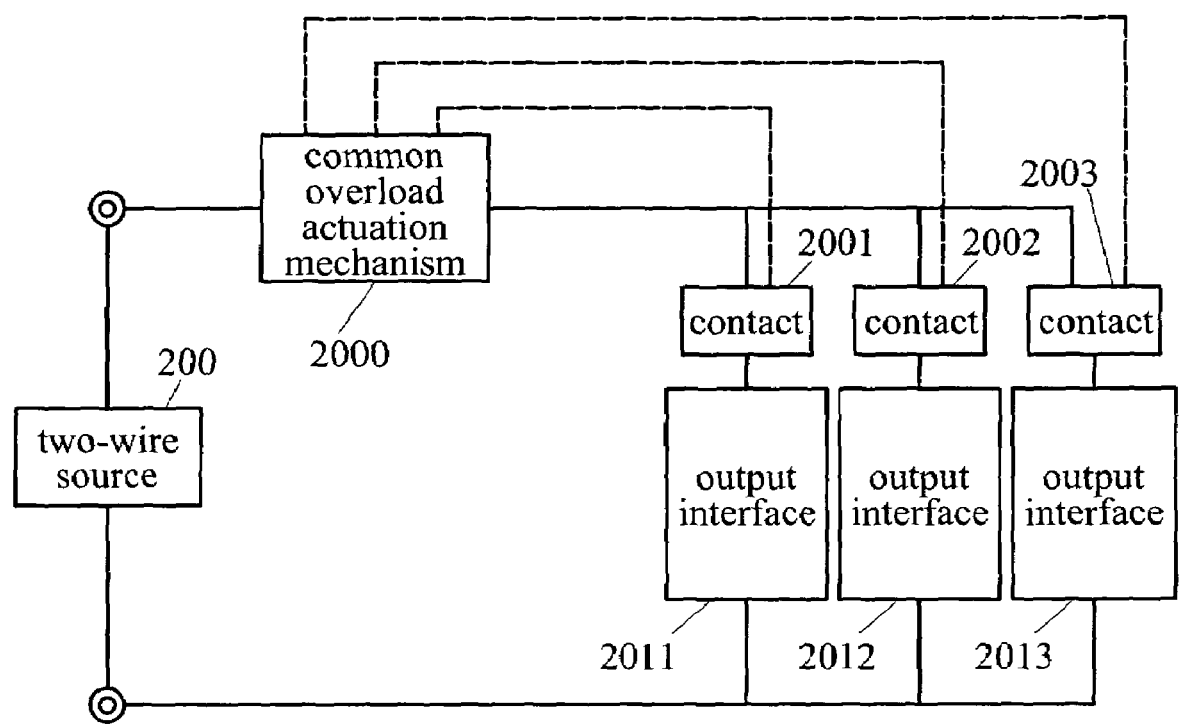
FIG. 7 is a schematic view of the present invention adapted with a circuit of a common multi-contact overload cutoff breaker comprised of two or more than two contacts and a matching common overload breaker.

Depending on the configuration as described above for the structure of the overload breaker, the present invention may be adapted with a circuit of a common multi-contact overload cutoff breaker comprised of two or more than two contacts and a matching common overload breaker as illustrated in FIG. 7, essentially comprised of:

A common multi-contact overload breaker controls a multi-output load that receives power from a DC or single-phase AC two-wire source 200. Two or more than two circuit breaking control contacts 2001, 2002, 2003 are adapted with a common overload actuation mechanism 2000. The common overload breaker is related to a thermally actuated breaking structure depending on the heat generated by overload current, or related to an EM actuated breaking mechanism excited by overload current to break the circuit. The device may further include a trip status retaining mechanism, e.g., a mechanism retaining the trip status by magnetic force of an EM coil, or by magnetic force of a permanent magnetic stick, or by a prestressed tenon, and that is manually reset or reset as driven by mechanical or EM force. The contact 2001 is subject to the control the common overload actuation mechanism 2000 and has a rated overload aperture breaking operation value slightly greater than that of the contact 2002, while the contact 2002 is subject to the control of the common overload actuation mechanism 2000 and has a rated overload amperage breaking operation value slightly greater than that of the contact 2003. A heating device actuated depending on the overload current or the actuation device excited by current may be employed. The common overload actuation mechanism 2000 is connected in series with the power cable while the contacts 2001, 2002, 2003 are respectively connected in series with corresponding output to respectively control each output. The circuit breaking control contact 2001 with a greater overload amperage is connected in series with a first output interface 2011 at the output with the top priority so to control the first output interface 2011. The circuit breaking control contact 2002 with the second greatest overload amperage is connected in series with a second output interface 2012 at the output with the secondary priority so to control the second output interface 2012, and the circuit breaking control contact 2003 with the least overload amperage is connected in series with a third output interface 2013 at the output with the third priority so to control the third output interface 2013. If the sum of the amperage remains excessively high, the contact 2003 with the least rated overload circuit breaking operation amperage trips off to reduce the overload current. If the sum of the amperage still remains excessively high, the contact 2002 with the second greatest overload circuit breaking operation amperage trips off to further reduce the sum of the overload current, and if the sum of the overload current still remains excessively high, the contact 2001 with the greatest overload circuit breaking operation amperage trips off to cut off all output current.

Figure 8:
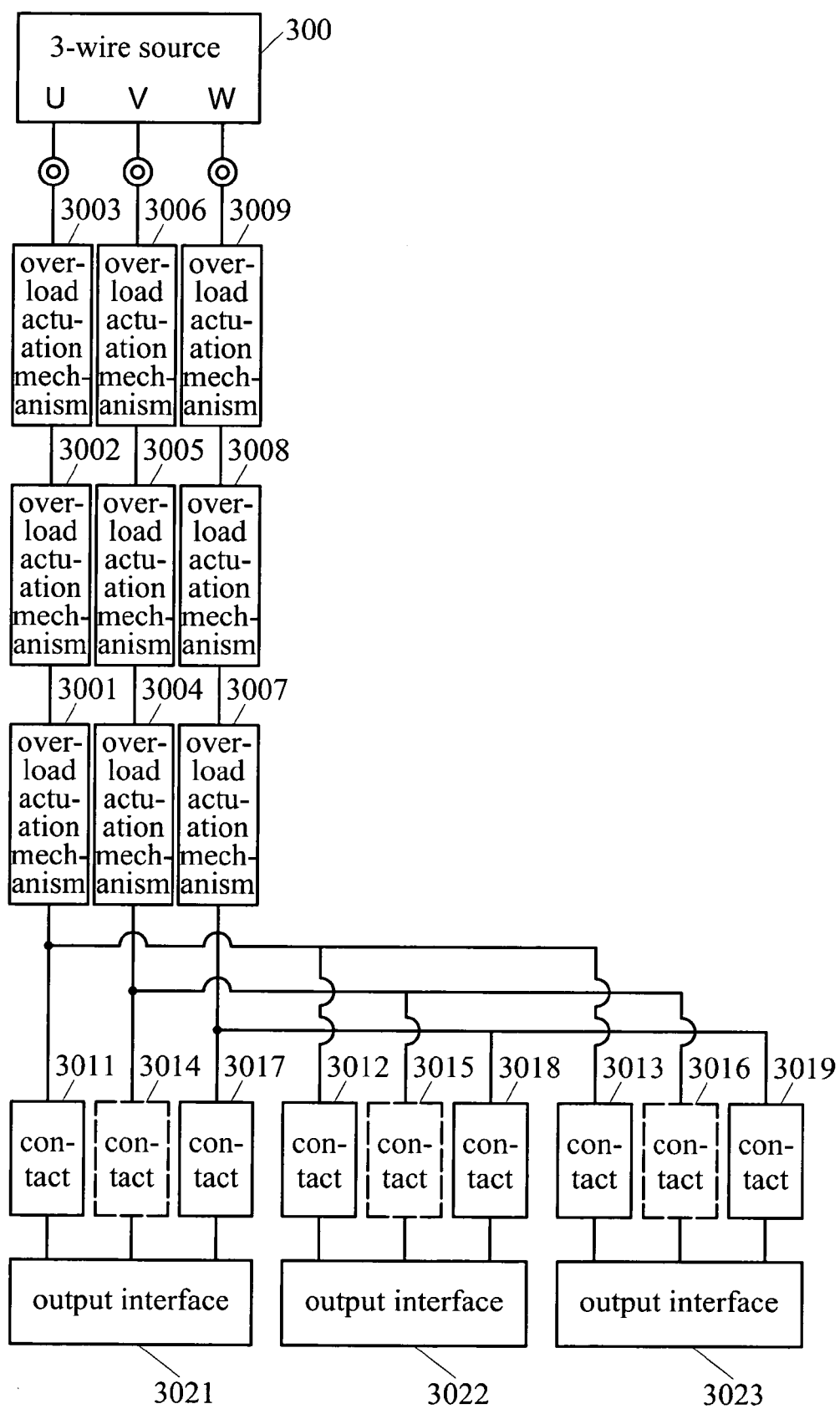
FIG. 8 is a schematic view of an applied 3-phase or 3-wire source of the present invention comprised of multiple units of independent overload breakers with different rated overload breaking amperage ratings.

The preferred embodiment given above is applied with a 2-wire circuit DC or a single-phase AC source 200. The multi-output circuit with preset priority can also be applied to a multi-phase or multi-wire source. As illustrated in FIG. 8 (a schematic view of an embodiment of the invention in which power is received from a 3-phase or 3-wire source), multiple units of independent overload breakers with different rated overload breaking amperage are employed, and the circuit is essentially comprised of:

A multi-output circuit with preset priority receives power from a 3-phase or 3-wire source 300. Two or more than two units of overload breakers, each provided with a different rated overload breaking current) are adapted respectively to a power cable of each phase or each power cable of the multi-wire source. Each overload breaker is comprised of a thermally actuated breaking structure that is responsive to heat generated from overload current, or an overload current excitement effect actuated breaking mechanism. Overload actuation mechanisms 3001, 3002, 3003 are connected in series with a U-phase source respectively controlling contacts 3011, 3012, and 3013. Overload actuation mechanisms 3004, 3005, 3006 are connected in series with a V-phase source respectively controlling contacts 3014, 3015, 3016, and overload actuation mechanisms 3007, 3008, 3009 are connected in series with a W-phase source respectively controlling contacts 3017, 3018, 3019. The rated overload amperage of the overload actuation mechanism 3001 is slightly greater than that of the overload actuation mechanism 3002, and the rated overload amperage of the overload actuation mechanism 3002 is slightly greater than that of the overload actuation mechanism 3003, the rated overload amperage of the overload actuation mechanism 3004 is slightly greater than that of the overload actuation mechanism 3005. The rated overload amperage of the overload actuation mechanism 3005 is slightly greater than that of the overload actuation mechanism 3006. The rated overload amperage of the overload actuation mechanism 3007 is slightly greater than that of the overload actuation mechanism 3008, and the rated overload amperage of the overload actuation mechanism 3008 is slightly greater than that of the overload actuation mechanism 3009. The overload breaker function is provided by the contact that is controlled by the cut-off exercised at the time of overload by a thermally actuated mechanism that responds to heat generated by the overload current or by a contract that is controlled to cut-off by a current excitement actuated mechanism. The device may also include a trip status retaining mechanism, e.g., a mechanism retaining the trip status by magnetic force of an EM coil, or by magnetic force of a permanent magnetic stick, or by a prestressed tenon, and that is manually reset or reset as driven by mechanical or EM force. The overload actuation heating device or EM actuated device of each overload breaker with a different rated overload amperage are connected in series to each other and respectively connected in series with the 3-phase or the 3-wire power cable. Contacts 3011, 3014, 3017 of overload breakers with different overload break amperage are respectively connected in series with each input of a first output interface 3021. Contacts 3012, 3015, 3018 of overload breakers with different overload break amperage are respectively connected in series with each input of a second output interface 3022. Contacts 3013, 3016, 3019 of overload breakers with different overload break amperage are respectively connected in series with each input of a third output interface 3023. The overload actuation mechanisms 3001, 3004, 3007 with greater overload amperage have their respective contacts 3011, 3014, 3017 connected in series to the first output interface 3021 at the output provided with the top priority so as to control the first output interface 3021. The overload actuation mechanisms 3002, 3005, 3008 with second greatest overload amperage have their respective contacts 3012, 3015, 3018 connected in series to the second output interface 3022 at the output provided with the second top priority so as to control the second output interface 3022. The overload actuation mechanisms 3003, 3006, 3009 with the least overload amperage have their respective contacts 3013, 3016, 3019 connected to the third output interface 3023 at the output provided with the top priority so as to control the third output interface 3023. If the sum of the output current at each output becomes greater than the rated value, the overload actuation mechanisms 3003, 3006, 3009 with the least overload amperage trip are first to cut off the output at 3023 so to reduce the sum of amperage outputted. If the sum of the output current remains greater than the rated amperage of the total load, the overload actuation mechanisms 3002, 3005, 3008 with the second greatest overload amperage trip off to further reduce its total load amperage. If the output current remains greater than the total rated amperage of the load, the overload actuation mechanisms 3001, 3004, 3007 with the greatest overload amperage trip off to cut off all the output current.

When a multi-phase source is used, the power cable of any phase may or may not be provided with an overload breaker as desired. When a multi-wire source is used, the neutral wire may be or may not be provided with an overload breaker as desired.

Figure 9:
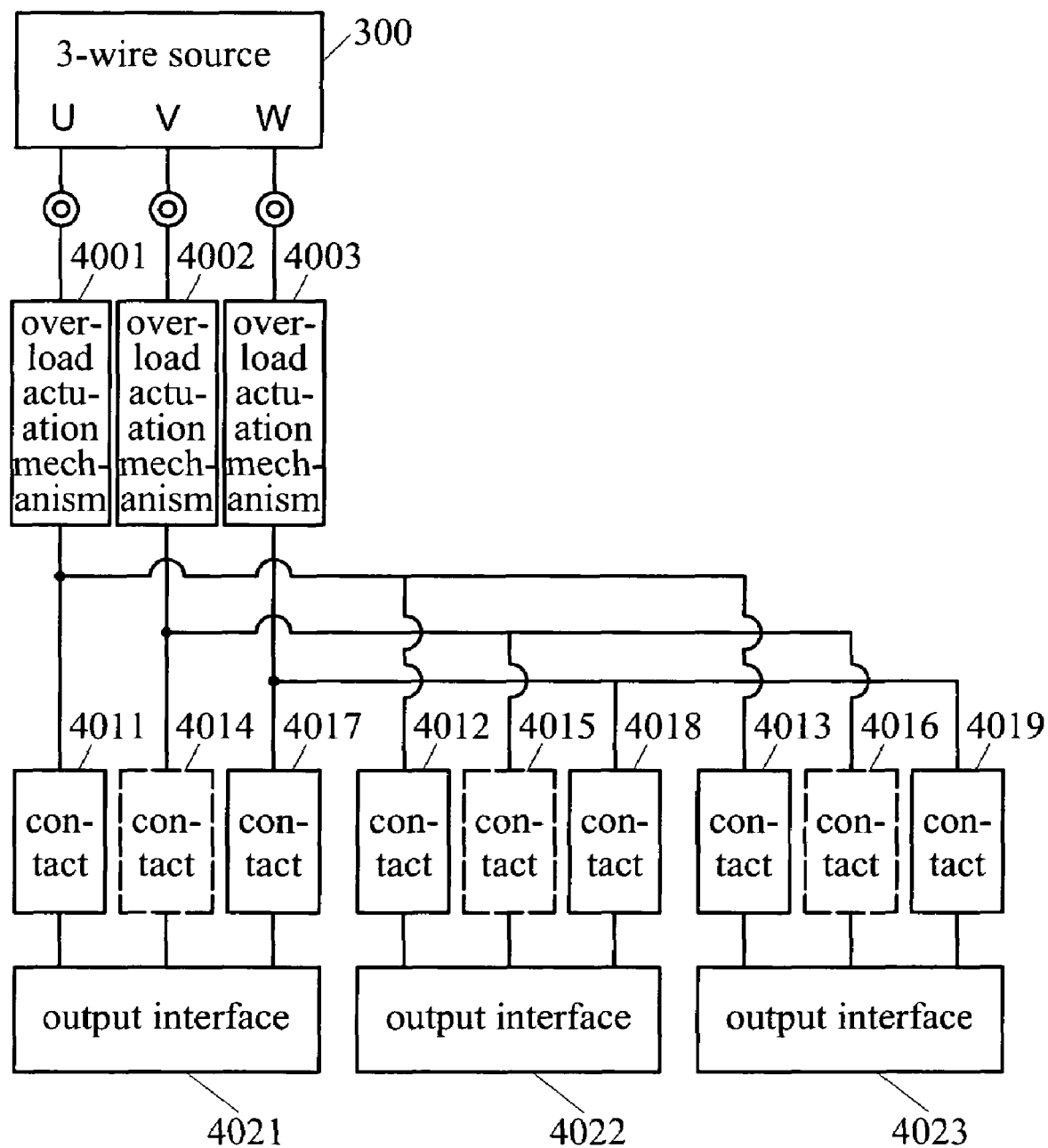
FIG. 9 is a schematic view of an applied 3-phase or 3-wire source comprised of a common multi-contact overload breaker.

The multi-output device with preset priority of the present invention can be further configured for use with a multi-phase or a multi-wire source as illustrated in FIG. 9, which shows a schematic view of an applied 3-phase or 3-wire source comprised of a common multi-contact overload breaker. The circuit is essentially comprised of:

A multi-output circuit with preset priority receives power from a 3-phase or 3-wire source 300. A common multi-contact overload breaker is comprised of overload actuation mechanisms 4001, 4002, 4003. They are respectively provided to each power cable of the multi-phase or the multi-wire source and to control contacts. The overload actuation mechanism 4001 is connected to a U-phase source and to control contacts 4011, 4012, 4013. The overload actuation mechanism 4002 is connected to a V-phase source and to control contacts 4014, 4015, 4016. The overload actuation mechanism 4003 is connected to a W-phase source and to control contacts 4017, 4018, 4019. Each overload actuation mechanism has either a thermally actuated break structure that responds to heat generated from the overload current, or a break mechanism actuated by an excitement effect from the overload current. The overload actuation mechanism 4001 connected in series with the U-phase source, the overload actuation mechanism 4002 connected in series to the V-phase source and the overload actuation mechanism 4003 connected in series to the W-phase source provide the function of an overload breaker. They do this either by cutting off the contacts controlled in a preset sequence by the thermally actuated mechanism depending on the various circuit breaking amperages, or by cutting off the contacts controlled in a preset sequence by the current excitement effect depending on various circuit breaking amperages. The device may further include a trip status retaining mechanism, e.g., a mechanism retaining the trip status by magnetic force of an EM coil, or by magnetic force of a permanent magnetic stick, or by a prestressed tenon, and that is manually reset or reset as driven by mechanical or EM force. The contacts 4011, 4014, 4017 preset with a comparatively higher overload amperage are connected to a first output interface 4021. The contacts 4012, 4015, 4018 with the second highest overload amperage are connected to a second output interface 4022, and those contacts 4013, 4016, 4019 with the least overload amperage are connected to a third output interface 4023. If the sum of the output current at each output becomes greater than the rated value, the overload actuation mechanisms 4013, 4016, 4019 with the least overload amperage trip first to cut off the third output interface 4023 so as to reduce the sum of amperage outputted. If the sum of output current remains greater than the rated amperage of the total load, the overload actuation mechanisms 4012, 4015, 4018 with the second greatest overload amperage trip off to cut off the output of the second output interface 4022 in order to further reduce the total load amperage. If the output current remains greater than the total rated amperage, the overload actuation mechanisms 4011, 4014, 4017 with the greatest overload amperage trip off to cut off all the output of the first output interface 4021, thus to cut off all the output current.

When a multi-phase source is used, the power cable of any phase may be provided or may not be provided with an overload breaker as desired. When a multi-wire source is used, the neutral wire may be or may not be provided with an overload breaker as desired.

Figure 10:
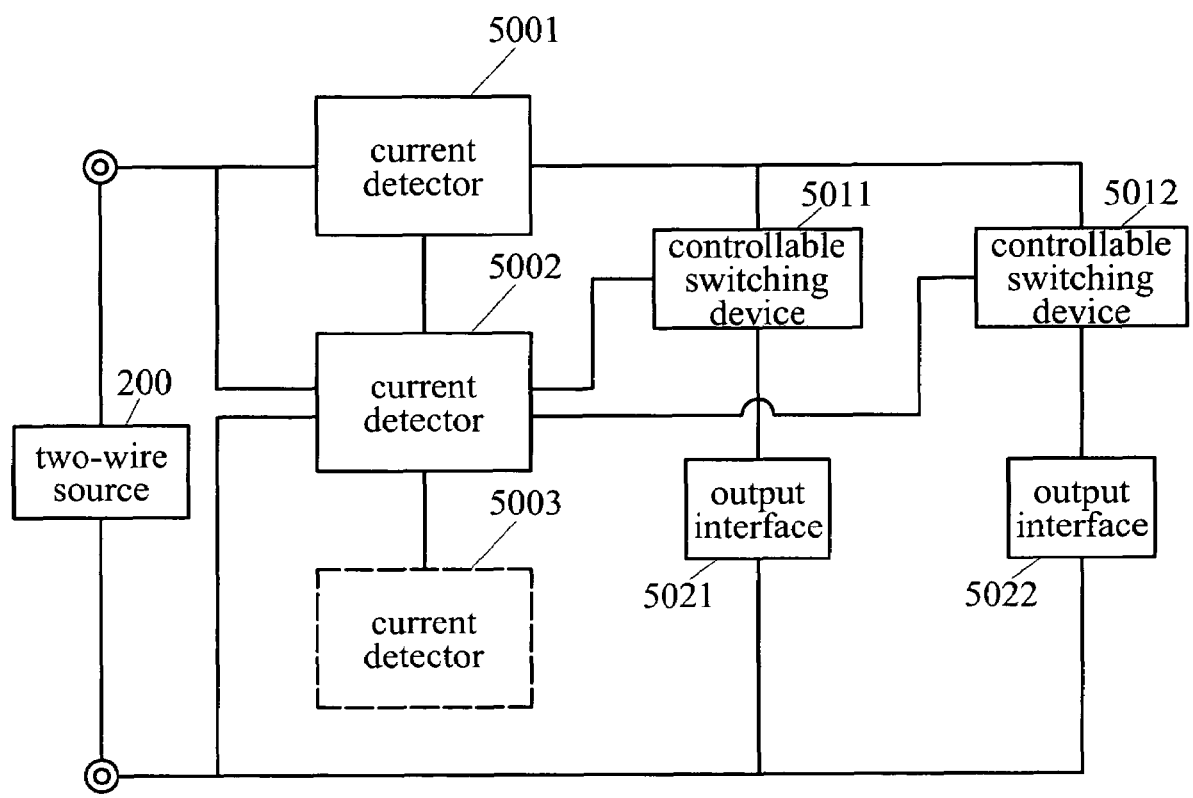
FIG. 10 is a schematic view of a preferred embodiment of the present invention applied in a DC or a single-phase two-wire source by a current detecting device and an output side switching device operated by a central control unit.

FIG. 10 shows a schematic view of another preferred embodiment of the present invention, for use with a DC or a single-phase two-wire source. This embodiment includes a current detect device and output side switching devices operated by a central control unit. In particular, the circuit includes a mechano-electronic or solid-status controllable switching devices 5011, 5012 and a common total current detector 5001, and is controlled by a central control device 5002. The central control device 5002 receives analog or digital signal representing the sum of the amperage from the total current detector 5001 and controls the controllable switching devices 5011, 5012 to be on or off. The controllable switching device 5011 is connected to a first output interface 5021, and the controllable switching device 5012 is connected to a second output interface 5022. The working principal for the central control device 5002 with respect to the switching device 5012 and the output interface 5022 is that once the sum of the load amperage exceeds the preset value, the power supply to the output interface with inferior priority is cut off while the power supply to the active output interface preset with a superior priority is maintained. The circuit is essentially comprised of:

A current detector 5001 is comprised of an amperage detection device provided with selected power, resistance and precision, or it is comprised of an EM inter-link type of current detector operating by induction, or it is comprised of any other conventional device and necessary interface circuit so to convert the load amperage of the power cable into digital or analog signals output to the central control device 5022.

a central control device 5002 is an analog or digital central control device comprised of a mechano-electronic unit or solid-state electronic circuitry, or it may be comprised of a micro-processor and related software. The central control device 500 receives signals of the total load amperage from the current detector 5001, and then compares the signals with the settings in the central control device 5002 so that once the total load amperage reaches or exceeds its setting for a preset period of time, the switching device connected in series with the output interface having the second top priority is cut off to reduce the total current. If the total load amperage remains excessively high, the switching device for the output interface with the top priority of power supply is cut off to completely stop power supply from the source;

controllable switching devices 5011, 5012 include two or more than two units of mechano-electronic or solid-state electronic, controllable switching devices. They are connected to their output interfaces, and subject to the control by the central control device 5002 to operate the output interface for power supply output or circuit breaking.

output interfaces 5021, 5022 are comprised of various power consumption load, or comprised of sockets, terminals, or other power distribution output interface. They are connected to mechano-electronic or solid-state contacts of the controllable switching devices 5011, 5012.

a display 5003, which is an optional device, is comprised of mechano-electronic or solid-state display device to display the status of feeding output or circuit breaking from each unit of the output interfaces 5021, 5022.

the source 300 can be a DC or an AC source.

Furthermore, the operation of the central control device 5002 may be provided with an auto reset power supply function. The central control device 5002 automatically cuts off the controllable switching device of the output interface given with the second top priority in case of the total current is overloaded to stop supplying power to the output interface, and once the difference between the total amperage and the overload breaking amperage reaches a preset value and such status has been confirmed for lasting a certain period, the central control device 5002 automatically resets the controllable switching device to resume power supply.

Figure 11:
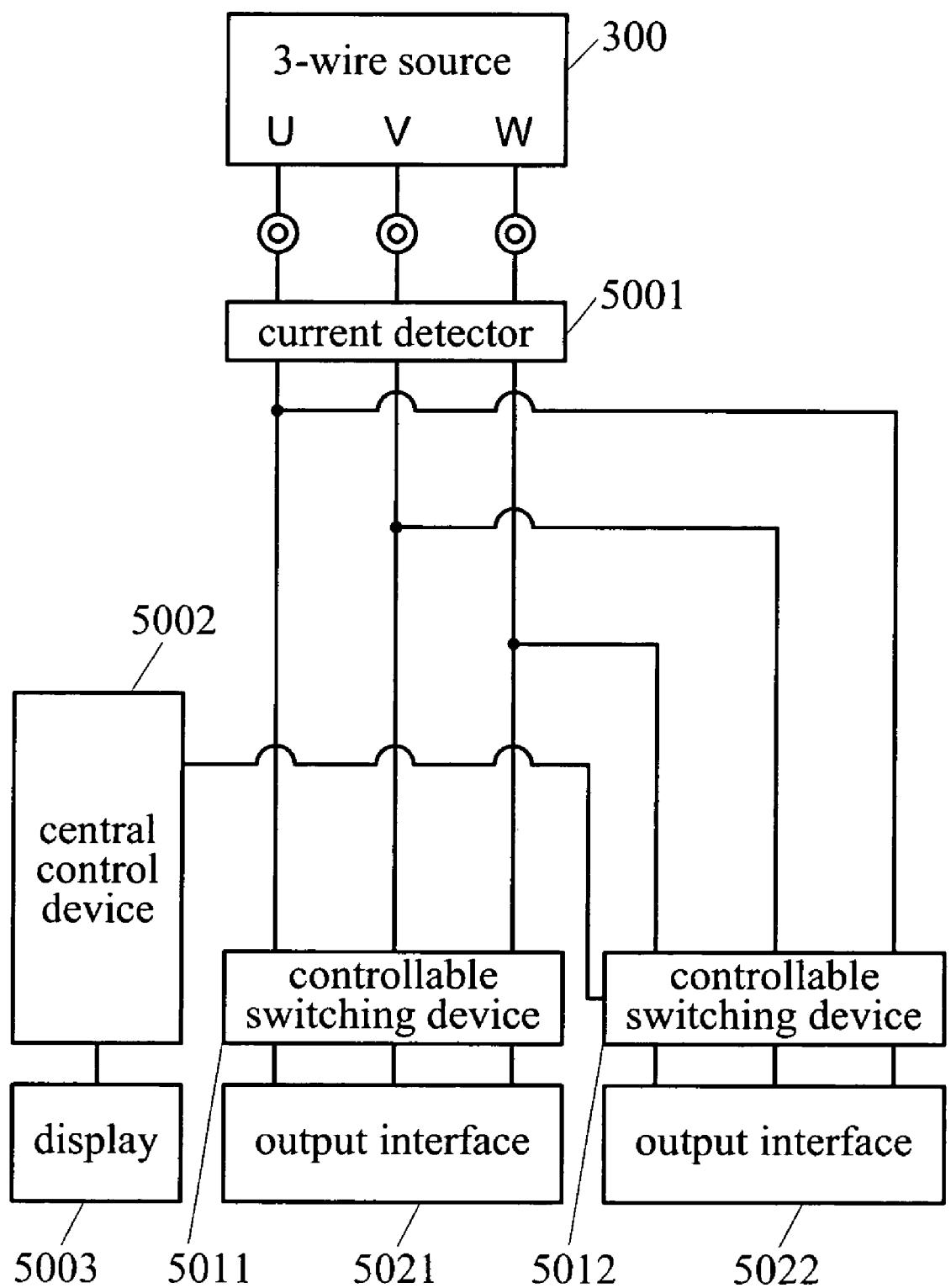
FIG. 11 is a schematic view of another preferred embodiment of the present invention applied in a multi-phase source by a current detecting device and an output side switching device operated by a central control unit.

Similarly, the preferred embodiment of the present invention illustrated in FIG. 10 may be further applied in a 2-phase or 3-phase source or a 3-wire source or any other multi-phase or multi-wire source. FIG. 11 is a schematic view of another preferred embodiment of the present invention applied in a multi-phase source by a current detect device and an output side switching device operated by a central control unit, wherein, a source 300 relates to a 3-phase or a 3-wire source with the working principles and members same as that disclosed in FIG. 10, thus the description is not repeated herein.

The multi-output circuit device with preset sequence of power supply of the present invention is applied in DC multi-voltage and multi-wire source, or AC 2-phase, or 2-phase and 3-wire source or AC 3-phase, or 3-phase and 4-wire source, or any other multi-phase and multi-wire source.

In the various applications of the present invention, overload breaks and their contacts of the output interface with the top priority of power supply may be comprised by independent device including thermally actuated bi-metal or memory alloy and contacts.

In case of larger power involved, the multi-output circuit device with preset sequence of power supply of the present invention in its various application may have each unit of output interface respectively controlled first by the contact control type of solid-state or mechano-electronic switching device operated by the overload actuation mechanism, then by the solid-state or mechano-electronic power type of switching device.

Figure 12:
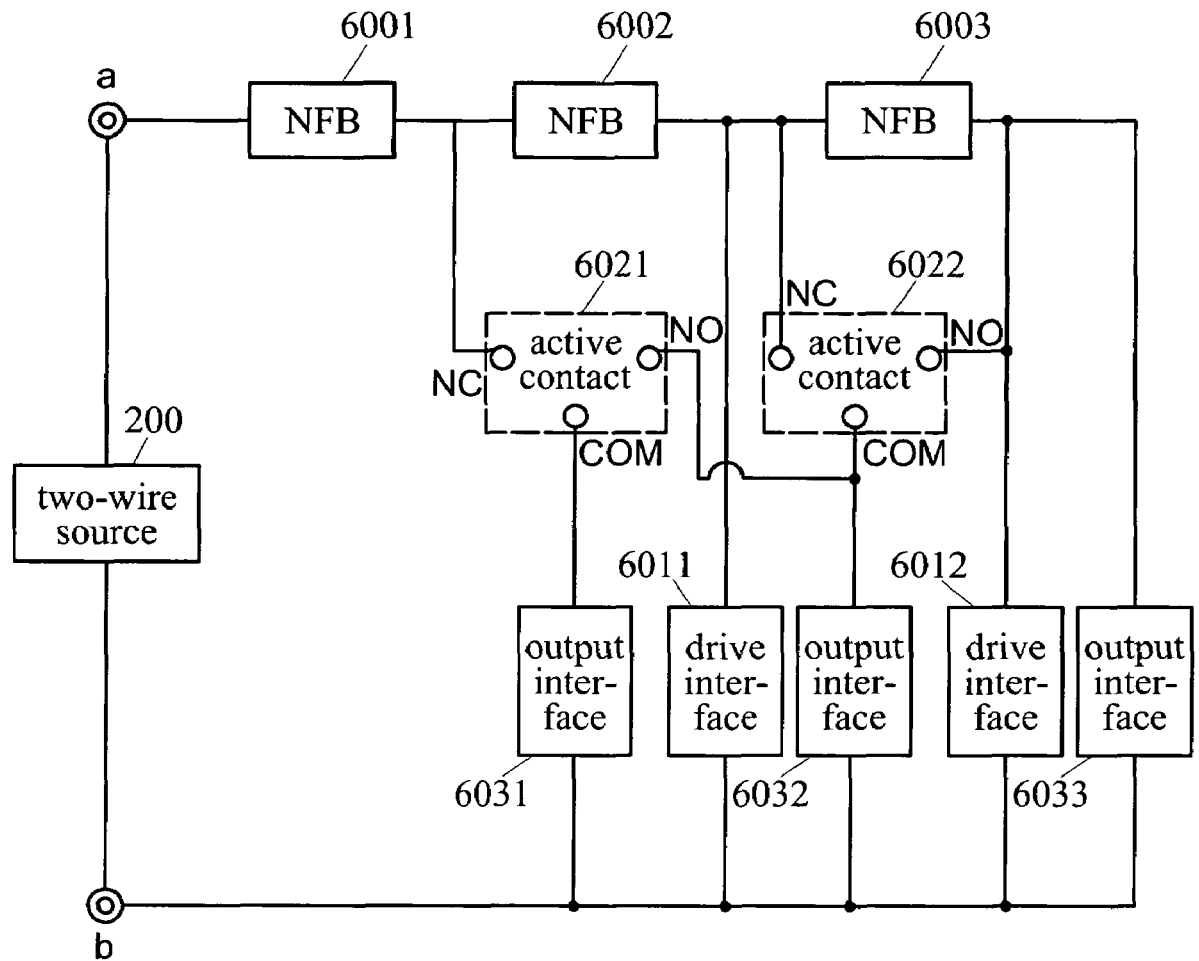
FIG. 12 is a schematic view showing a circuit comprised of a plurality of no fuse breakers connected in series with different overload breaking amperage ratings of the present invention.

Furthermore as illustrated in FIG. 12, a schematic view showing a circuit comprised of a plurality of no fuse breakers connected in series with different overload breaking amperage ratings of the present invention, a no fuse breaker (NFB) of different specification may be used to be incorporated with the mechano-electronic or solid-state switching device so to replace the overload breaker and its contact. Wherein, the circuit is essentially comprised of a first unit of NFB 6001, a second unit of NFB 6002 and a third unit of NFB 6003 (in the preferred embodiment, three units are used), a first output interface 6031, a second output interface 6032 and a third output interface 6033 (in the preferred embodiment, three output interfaces are used), a drive interface 6011 of a first mechano-electronic or solid-state switching device, another drive interface 6012 of a second mechano-electronic or solid-state switching device, a first unit of active contact 6021 provided with a common pin (COM), normally closed pin (NC) and normally open pin (NO), and a second unit of active contact 6022 provided with a common pin (COM), normally closed pin (NC) and normally open pin (NO), wherein, the rated amperage for the breaking operation by the first unit of NFB 6001 is greater than that of the second unit of NFB, and the rated amperage for the breaking operation by the second unit of NFB 6002 is greater than that of the third unit of NFB 6003 with all three units of NFBs 6001, 6002, 6003 connected in series and arranged by having the first unit of NFB 6001 provided at where closer to terminal a of the source, and the third unit of NFB 6003 closer to the load terminal with the second top priority while the drive interface 6011 of the first unit of mechano-electronic or solid-state switching device is connected in parallel at where between the point the second and the third units of NFBs 6002, 6003 connected in series and terminal b of the source; the NC pin of the first active contact 6021 is connected to where the first and the second units of NFBs 6001, 6002 are connected in series; the NC pin of the second active contact 6022 is connected to where the second and the third units of NFBs 6002, 6003 are connected in series; the COM pin of the first unit of active contact 6021 is connected in series to the first output interface 6031, then to the terminal b of the source; the COM pin of the second unit of active contract 6022 is connected in series to the second output interface 6032, then to the terminal b of the source; the NO pin of the first unit of active contact 6021 connects the connection between the COM pin of the second unit of active contact 6022 and the second output interface 6032, the NO pin of the second unit of active contact 6022 connects the connection between the third unit of NFB 6003 and the third output interface 6033; in normal operation of the circuit, electric energy from terminal a of the source passes through the first unit of NFB 6001, the second unit of NFB 6002, and the third unit of NFB 6003 to supply power to the third output interface 6033, NC pin and COM pin of the active contact 6022 from the second unit of mechano-electronic or solid-state switching device driven by the drive interface 6012 of the second unit of mechano-electronic or status switching device supply the electric energy from a power cable a to the second output interface 6032; NC pin and COM pin of the active contact 6021 from the first unit of mechano-electronic or solid-state switching device driven by the drive interface 6011 of the first unit of mechano-electronic or status switching device supply the electric energy from a power cable a to the first output interface 6031; once the total load amperage outputted from the source 200 exceeds the rating and an overload takes place, the third unit of NFB 6003 with the least rated amperage for breaking operation breaks first to cut off the power supply to the third output interface 6033, and the drive by the active contact 6022 of the drive interface 6012 of the second unit of mechano-electronic or solid-state switching device, meanwhile, electric energy from terminal a of the source maintains its power supply through the first and the second units of NFBs 6001, 6002, NC pin and COM pin of the second unit of active contact 6022 to the second output interface 6032, and through the NO pin and COM pin of the first unit of active contact 6021 to the first output interface 6031; if the total load current remains higher than the rating, the scorned unit of NFB 6002 with the second largest rated amperage for breaking operation breaks to cut off the power supply to the second output interface 6032, and the drive by the drive interface 6011 of the first unit of mechano-electronic or solid-state switching device, meanwhile, the electric energy from terminal a of the source is supplied through the first unit of NFB 6001 and he NC pin and the COM pin of the first unit of active contact 6021 to the first output interface 6031; if eventually the load amperage remains overloaded, the first unit of NFB 6001 breaks to cut off all loads.

The present invention can be applied in the outdoor transmission and distribution systems, or indoor systems in a building, industrial facilities or home, or distribution circuit device of automobile, sea vessel or aircraft, power supply distribution system in a computer, communication equipment, work station, data storage device or other independent electric equipment, or distribution control of urgent power supply (UPS), or extension socket or concealed type of socket, independent generation equipment, e.g. the output distribution power control of generator, power supply type of circuit device in a tooling machine or industrial machine characterized by having provided local power control distribution device with multi-output interface to supply power to individual load unit. Wherein, the multi-output circuit device with preset priority of power supplies of the present invention controls the priority sequence of power supply, presents overload and total blackout caused by local changes.

To sum up, a multi-output circuit device with preset priority of power supply by providing a specific, innovative circuit device gives the conventional multi-output circuit priority of power supply to prevent sudden trip of all loads due to that the composite amperage becomes greater than the rating of the overload breaker in the local application. For example, the priority may be set to have the lighting load during night hours at top priority, so that in case of overload, all the loads from the output interfaces for other functions other than night lighting will be excluded. The present invention provides such specific function with a specific circuit configuration gives reliable function and innovative creativity, therefore, this application is duly filed accordingly.

The invention claimed is:

1. A multi-output circuit device with preset power supply priority, comprising:
    first and second power supply terminals for receiving power from a power source;
    first and second conductors;
    first and second normally closed overload breaking switches;
    a first output interface for conveying electricity to a first load, the first overload breaking switch and first output interface being connected in series between the first and second conductors;
    a second output interface for conveying electricity to a second load, the second overload breaking switch and second output interface being connected in series between the first and second conductors; and
    connection means for connecting the first power supply terminal to the first conductor and for connecting the second power supply terminal to the second conductor, the connection means including overload actuation mechanism means for opening the first overload breaking switch if the current flowing between the first and second power supply terminals exceeds a first predetermined value and for opening the second overload breaking switch if the current flowing between the first and second power supply terminals exceeds a second predetermined; value,
    wherein the overload actuation mechanism means comprises first and second overload actuation mechanisms that form a logic circuit having priority to supply power, and the current that flows between the first and second power supply terminals also flows through each of the overload actuation mechanisms, and
    wherein each of the overload actuation mechanisms comprises an electromagnet.

2. The multi-output circuit device of claim 1, further comprising:

a third normally closed overload breaking switch; and a third output interface for conveying electricity to a third load, the third overload breaking switch and the third output interface being connected in series between the first and second conductors, wherein the overload actuation means additionally opens the third overload breaking switch if the current between the first and second power supply terminals exceeds a third predetermined value.

3. A multi-output circuit device with preset power supply priority, comprising:

first, second, and third power supply terminals for receiving a U phase, a V phase, and a W phase from a power source;

first, second, and third conductors;

a pair of first normally closed overload breaking switches;

a pair of second normally closed overload breaking switches;

a pair of third normally closed overload breaking switches;

a first output interface for conveying electricity to a first three-phase load, one of the first overload breaking switches being connected between the first conductor and the first output interface, one of the second overload breaking switches being connected between the second conductor and the first output interface, and one of the third overload breaking switches being connected between the third conductor and the third output interface;

a second output interface for conveying electricity to a second three-phase load, the other of the first overload breaking switches being connected between the first conductor and the second output interface, the other of the second overload breaking switches being connected between the second conductor and the second output interface, and the other of the third overload breaking switches being connected between the third conductor and the second output interface; and connection means for connecting the first, second, and third power supply terminals respectively to the first, second, and third conductors, the connection means including overload actuation mechanism means for opening said one of the first overload breaking switches, said one of the second overload breaking switches, and said one of the third overload breaking switches if current supplied via said first, second, and third power supply terminals is greater than a first predetermined value, and for opening said other of the first overload breaking switches, said other of the second overload breaking switches, and said other of the third overload breaking switches if the current supplied via said first, second, and third power supply terminals is greater than a second predetermined value, wherein the overload actuation mechanism means comprises at least three overload actuation mechanisms that form a logic circuit having priority to supply power, and wherein each of the overload actuation mechanisms comprises a heating element.

4. The multi-output circuit device of claim 3, further comprising:

another first normally closed overload breaking switch; another second normally closed overload breaking switch; another third normally closed overload breaking switch; and a third output interface for conveying electricity to a third three-phase load, the another first overload breaking switch being connected between the first conductor and the third output interface, the another second overload breaking switch being connected between the second conductor and the third output interface, and the another third overload breaking switch being connected between the third conductor and the third output interface, wherein the overload actuation mechanism means additionally opens the another first overload breaking switch, the another second overload breaking switch, and the another third overload breaking switch if the current supplied via the first, second, and third power supply terminals is greater than a third predetermined current.

5. A multi-output circuit device with preset power supply priority, comprising:

first, second, and third power supply terminals for receiving a U phase, a V phase, and a W phase from a power source;

first, second, and third conductors;

a pair of first normally closed overload breaking switches;

a pair of second normally closed overload breaking switches;

a pair of third normally closed overload breaking switches;

a first output interface for conveying electricity to a first three-phase load, one of the first overload breaking switches being connected between the first conductor and the first output interface, one of the second overload breaking switches being connected between the second conductor and the first output interface, and one of the third overload breaking switches being connected between the third conductor and the third output interface;

a second output interface for conveying electricity to a second three-phase load, the other of the first overload breaking switches being connected between the first conductor and the second output interface, the other of the second overload breaking switches being connected between the second conductor and the second output interface, and the other of the third overload breaking switches being connected between the third conductor and the second output interface; and connection means for connecting the first, second, and third power supply terminals respectively to the first, second, and third conductors, the connection means including overload actuation mechanism means for opening said one of the first overload breaking switches, said one of the second overload breaking switches, and said one of the third overload breaking switches if current supplied via said first, second, and third power supply terminals is greater than a first predetermined value, and for opening said other of the first overload breaking switches, said other of the second overload breaking switches, and said other of the third overload breaking switches if the current supplied via said first, second, and third power supply terminals is greater than a second predetermined value, wherein the overload actuation mechanism means comprises at least three overload actuation mechanisms that form a logic circuit having priority to supply power, and wherein each of the overload actuation mechanisms comprises an electromagnet.

6. The multi-output circuit device of claim 1, wherein each of the overload actuation mechanisms are connected in series.

7. A multi-output circuit device with preset power supply priority, comprising:
   first and second power supply terminals for receiving power from a power source;
   first and second conductors;
   first and second normally closed overload breaking switches;
   a first output interface for conveying electricity to a first load, the first overload breaking switch and first output interface being connected in series between the first and second conductors;
   a second output interface for conveying electricity to a second load, the second overload breaking switch and second output interface being connected in series between the first and second conductors; and
   connection means for connecting the first power supply terminal to the first conductor and for connecting the second power supply terminal to the second conductor, the connection means including overload actuation mechanism means for opening the first overload breaking switch if the current flowing between the first and second power supply terminals exceeds a first predetermined value and for opening the second overload breaking switch if the current flowing between the first and second power supply terminals exceeds a second predetermined value,
   wherein the overload actuation mechanism means comprises first and second overload actuation mechanisms that form a logic circuit having priority to supply power, and the current that flows between the first and second power supply terminals also flows through each of the overload actuation mechanisms, and
   wherein each of the overload actuation mechanisms comprises a heating element.

8. The multi-output circuit device of claim 7, further comprising:
   a third normally closed overload breaking switch; and
   a third output interface for conveying electricity to a third load, the third overload breaking switch and the third output interface being connected in series between the first and second conductors,
   wherein the overload actuation means additionally opens the third overload breaking switch if the current between the first and second power supply terminals exceeds a third predetermined value.

9. The multi-output circuit device of claim 7, wherein each of the overload actuation mechanisms are connected in series.

10. The multi-output circuit device of claim 5, further comprising:
   another first normally closed overload breaking switch; another second normally closed overload breaking switch; another third normally closed overload breaking switch; and
   a third output interface for conveying electricity to a third three-phase load, the another first overload breaking switch being connected between the first conductor and the third output interface, the another second overload breaking switch being connected between the second conductor and the third output interface, and the another third overload breaking switch being connected between the third conductor and the third output interface,
   wherein the overload actuation mechanism means additionally opens the another first overload breaking switch, the another second overload breaking switch, and the another third overload breaking switch if the current supplied via the first, second, and third power supply terminals is greater than a third predetermined current.

11. The multi-output circuit device of claim 5, wherein each of the overload actuation mechanisms are connected in series.

* * * * *